United States Patent Office 3,515,294
Patented June 2, 1970

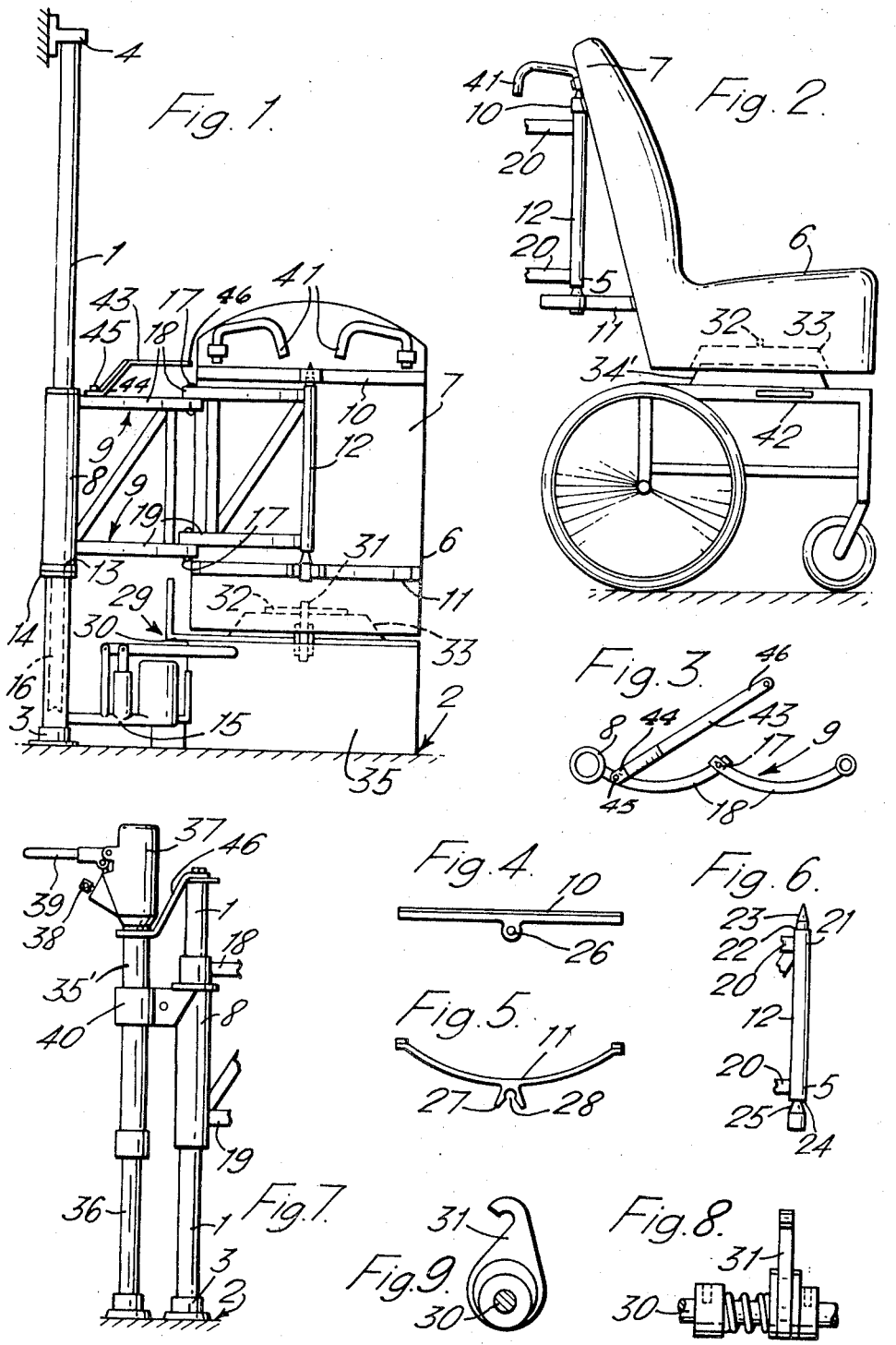

3,515,294
APPARATUS FOR USE IN ENABLING IMMOBILE PERSONS AND INVALIDS TO BE PLACED IN OR REMOVED FROM A VEHICLE
Leonard B. Southward, Port Road, Lower Hutt, North Island, New Zealand, and Maurice H. Fougere, Lower Hutt, North Island, New Zealand (64 Esplanade, Paremata, North Island, New Zealand)
Filed Mar. 19, 1968, Ser. No. 714,270
Claims priority, application New Zealand, Mar. 23, 1967, 148,248
Int. Cl. B60p 1/46
U.S. Cl. 214—75                10 Claims

ABSTRACT OF THE DISCLOSURE

An apparatus for enabling immobile persons and invalids to be placed in or removed from a vehicle in which a seat is arranged to be raised and lowered relative to the vehicle and swung out from or into the vehicle while supporting a person with the person remaining in the seat while being transported in the vehicle.

This invention relates to apparatus for use in enabling immobile persons and invalids to be placed in or removed from a vehicle such as a motor car particularly where the invalid or immobile person is not able to help himself into or out of a vehicle.

The object of this invention is to provide apparatus for use in enabling immobile persons and invalids to be placed in or removed from a vehicle whereby a seat is arranged to be raised and lowered in relation to the vehicle and swivelled out from, or into, or back into the vehicle while supporting a person and whereby the person remains in the seat while being transported in the vehicle.

According to this invention, the apparatus for placing a person in and removing a person from a vehicle comprises a seat for a person, a back for the seat, a support adapted to be fixed uprightly on the floor of a vehicle, a sleeve slidable and turnable on the support, arms arranged in upper and lower pairs, with each pair being pivotally connected together and attached at one of their ends to the sleeve and having their other ends pivotally connected to the back of the seat, and means for moving the sleeve on the support and carrying the seat to a desired position in relation to a vehicle in receiving or moving a person in and out of a vehicle.

The invention will now be further described with reference to the accompanying drawings in which:

FIG. 1 is an elevational rear view of the apparatus situated in a vehicle,

FIG. 2 is an elevational side view of part of the apparatus and a seat being lowered onto a trolley, FIG. 3 is a plan view of the upper arms shown in FIG. 1, FIG. 4 is a plan view of the upper bracket shown in FIG. 1, FIG. 5 is a plan view of the lower bracket shown in FIG. 1, FIG. 6 is an elevational view of the pivot pin shown in FIG. 1, FIG. 7 is a view in elevation of an alternative hydraulic jack from that shown in FIG. 1, FIG. 8 is an enlarged view of the locking device for holding the seat to a base in a vehicle or to a trolley, and FIG. 9 is an enlarged view of the eccentric pin of the locking device of FIG. 8.

As shown in FIG. 1 a tubular column constituting a support 1 is fixed uprightly on a vehicle chassis as indicated by arrow 2 and is stepped as at 3 in the vehicle 2. The support 1 has a bracket 4 for enabling the support 1 to be kept upright in relation to the vehicle 2.

In FIG. 1, the support 1 is placed in a position associated with a seat 6 having a back 7 and the seat 6 is detached from the vehicle 2 and is movable vertically and horizontally in relation to the vehicle 2 as well as being adapted to swivel in relation thereto.

The seat 6 is detached from the vehicle 2 by a locking device in a base 35 (FIG. 1) on the floor of the vehicle 2 as indicated by arrow 29. The device includes a turnable shaft 30 which carries a hook 31 eccentrically arranged to engage and bear down on a pin 32 in the seat 6 as shown in FIG. 1. The seat 6 is provided with a concave portion 33 (FIG. 2) which engages on a convex portion 34 on the base 35 when the seat 6 in the vehicle 2 or a convex portion 34′ on a trolley 42 is in its lowered and correct position in relation to the vehicle 2 or the trolley 42.

In FIG. 1 a sleeve 8 is slidable on the support 1 and arms 9 are pivotally connected to the seat 6 and more particularly to the back 7 thereof. The seat 6 or its back 7 has brackets 10, 11 receiving a pivot pin 12 to which the arms 9 are connected.

The arms 9 are arranged in upper and lower pairs 18, 19 and have ends 20 pivotally associated with the back 7 of the seat 6. The pivot pin 12 is attached to the ends 20 (FIG. 6) of the arms 9 to conjoin the upper pair 18 to the lower pair 19 and the pivot pin 12 is turnably associated with the back 7. As shown in FIG. 6, the pivot pin 12 has an upper end 21 shouldered at 22 and terminating upwards in a tapered projection or spike 23. The lower end 5 of the pivot pin 12 has a shoulder 24 and terminates downwards in a tapered bearing surface 25.

Referring to FIGS. 2–4, the brackets 10, 11 which are the upper and lower brackets respectively project rearwardly from the back 7, and the upper bracket 10 has an eye 26 for receiving the upper end 21 of the pivot pin 12. The lower bracket 11 is formed with a splayed apart entrance 27 leading to an open slot 28 for receiving the tapered bearing surface 25 of the pivot pin 12.

As illustrated in FIG. 1, the sleeve 8 is provided with a collar 13 for enabling the sleeve 8 to be connected with means for moving the sleeve 8 on the support 1, such as a plate 14 engaging under the collar 13.

According to FIG. 1, the means for moving the sleeve 8 on a support 1 and carrying the seat 6 to a desired position in relation to the vehicle 2, is a hydraulic jack 15 such as that used for changing tires on a motor vehicle. The jack 15 has a ram connected with the plate 14 to engage with the sleeve 8.

Thus the means for moving the sleeve 8 is in the form of a hydraulically operated device included in the column 1. The column and its sleeve 8 and the hydraulic ram 16 are arranged telescopcially to enable the seat 6, through the arms 9, to be raised or lowered in relation to the vehicle 2.

In a further form, the hydraulic jack is arranged apart from the support 1, and a pressure cylinder 35′ and ram 36 associated with and separate from the support 1 is affixed in and to the vehicle. The pressure cylinder 35′ has a pump 37 with pump valves (not shown) operated by a pump valve control 38 and an actuating handle 39 at or near the upper end of the pressure cylinder 35′. A collar 40 carried on the ram 36 engages the sleeve 8 to move the sleeve to a raised or lowered position. The pressure cylinder 35′ and the support 1 are held in juxtaposition by a strap 46.

Further, the hydraulic means which may be in the form of a hydraulic jack 15, may be operated from the motor of the vehicle 2 or the hydraulic jack 15 may be associated with an oil pressure system of the vehicle 2 for operating the hydraulic jack 15 as may be desired.

As shown in FIGS. 1 and 3, the pairs of arms 18, 19 are locked from pivoting on central pintles 17 by a stay 43 having one end 44 of the upper pair 18 connected at 45 near the sleeve 8 and the stay 43 is engageable by its holed other end 46 with the upper end 23 of the pivot pin 12.

The column 1 is stepped and anchored to the floor of the vehicle 2 and the arrangement is such that the arms 9 turning with the sleeve 8 on the support 1 enable the seat 6 to be passed out through the door of the vehicle 2 when the door is open, or the seat 6 returned into the vehicle 2. The door is closed after a person has been picked up on the seat 6 and so raised and brought into the vehicle 2 on the seat 6 and then lowered into a position of a passenger in the vehicle 2.

As shown in FIG. 3, the arms 9 are arcuate formation with the ends of the arms curved forwardly towards the back for the seat 6 and each pair of arcuate arms 9 has a central pintle 17. Handles 41 are provided on the back 7 of the seat 6 to enable a trolley 42 to be pushed along the ground when the seat 6 is swung out through a vehicle door and lowered onto the trolley 42, and then the pivot pin 12 is disengaged from the brackets 10 and 11.

What we do claim and desire to obtain by letters Patent of the United States of America is:

1. In a vehicle with a supporting surface, the improvement comprising means for enabling immobile persons to be placed in and removed from the vehicle, said means including a seat having a back, an upright tubular column fixed on the supporting surface, a sleeve slidable and turnable on the tubular column, arms arranged in upper and lower pairs, each pair of arms being pivotally connected together, means attaching one end of each pair of arms to the sleeve, means pivotally connecting the other end of each pair of arms to the back of the seat, means for moving the sleeve on the tubular column for carrying the seat to a desired position in relation to the supporting surface in receiving or moving a person in and out of the vehicle, and complemental means on the seat and supporting surface respectively for attaching and detaching the seat to the supporting surface.

2. The apparatus for placing a person in and removing a person from a vehicle as claimed in claim 1 in which the means pivotally connecting the other end of each pair of arms includes a pivot pin attached to the ends of the upper and lower arms to conjoin such upper and lower pairs of arms, and the pivot pin being turnably associated with the back of the seat.

3. The apparatus for placing a person in and removing a person from a vehicle as claimed in claim 2 wherein the upper and lower pairs of arms are arcuate in form with ends of the arms curved forwardly towards the back of the seat and each pair of arcuate arms having a central pintle.

4. The apparatus for placing a person in and removing a person from a vehicle as claimed in claim 2 wherein the pivot pin has an upper end shouldered and terminating upwards in a tapered projection and a lower end of the pivot pin has a shoulder and terminates downwards in a tapered bearing surface.

5. The apparatus for placing a person in and removing a person from a vehicle as claimed in claim 2 wherein the back of the seat has vertically spaced brackets projecting rearwardly, the upper of the brackets having an eye to receive the upper end of the pivot pin and the lower bracket being formed with a splayed apart entrance to an open slot to receive the lower end of the pivot pin.

6. The apparatus for placing a person in and removing a person from a vehicle as claimed in claim 5 wherein the moving means includes a hydraulic jack for engaging with the sleeve on the column to move the sleeve and the arms and the pivot pin engaged in the brackets to carry the seat to a raised or lowered position.

7. The apparatus for placing a person in and removing a person from a vehicle as claimed in claim 6 wherein the hydraulic jack is accommodated in the column, and a pump, pump valves and actuating handle therefor being apart from the column.

8. The apparatus for placing a person in and removing a person from a vehicle as claimed in claim 6 wherein the hydraulic jack has a pressure cylinder and ram associated with and separate from the column and affixed in and to the vehicle, and the pressure cylinder has a pump, pump valves, pump valve control, an actuating handle adjacent the upper end of the pressure cylinder, and a collar carried by the ram engageable with the sleeve to move the sleeve to a raised or lowered position.

9. The apparatus for placing a person in and removing a person from a vehicle as claimed in claim 5 wherein the arms are locked from pivoting on central pintles by a stay having one end pivotally connected near the end of the upper pair of arms attached to the sleeve of the column and the stay being engageable by its other end with the upper end of the pivot pin at the other end of the arms near the back of the seat.

10. The apparatus for placing a person in and removing a person from a vehicle as claimed in claim 2 wherein the upper end of the pivot pin is adapted to receive and hold into an end of a stay.

References Cited

UNITED STATES PATENTS

| 2,846,091 | 8/1958 | Heffner | 214—77 |
| 2,930,499 | 3/1960 | Landen | 214—75 |
| 3,268,918 | 8/1966 | Batty et al. | 214—730 |

FOREIGN PATENTS 691,591  7/1964  Canada.

GERALD M. FORLENZA, Primary Examiner

R. B. JOHNSON, Assistant Examiner

U.S. Cl. X.R.

214—730